(12) United States Patent
Gatland

(10) Patent No.: US 10,191,153 B2
(45) Date of Patent: Jan. 29, 2019

(54) AUGMENTED REALITY SONAR IMAGERY SYSTEMS AND METHODS

(71) Applicant: FLIR Systems, Inc., Wilsonville, CA (US)

(72) Inventor: Christopher Daniel Gatland, Fareham (GB)

(73) Assignee: FLIR Systems, Inc., Wilsonville, OR (US)

( * ) Notice: Subject to any disclaimer, the term of this patent is extended or adjusted under 35 U.S.C. 154(b) by 167 days.

(21) Appl. No.: 15/443,836

(22) Filed: Feb. 27, 2017

(65) Prior Publication Data

US 2017/0168159 A1    Jun. 15, 2017

Related U.S. Application Data

(63) Continuation of application No. PCT/US2015/045962, filed on Aug. 19, 2015.
(Continued)

(51) Int. Cl.
*G01S 15/89* (2006.01)
*G01S 15/02* (2006.01)
(Continued)

(52) U.S. Cl.
CPC ............ *G01S 15/89* (2013.01); *G01S 7/6263* (2013.01); *G01S 7/6281* (2013.01); *G01S 15/025* (2013.01); *G01S 15/96* (2013.01)

(58) Field of Classification Search
CPC ........ G01S 15/89; G01S 7/6281; G01S 15/96; G01S 15/025; G01S 7/6263
See application file for complete search history.

(56) References Cited

U.S. PATENT DOCUMENTS

| 5,633,710 A | 5/1997 | Kumra et al. |
| 7,098,458 B2 | 8/2006 | Kuerbitz et al. |

(Continued)

FOREIGN PATENT DOCUMENTS

| WO | WO 2010/141011 | 12/2010 |
| WO | WO 2013/108088 | 7/2013 |

(Continued)

OTHER PUBLICATIONS

Augmented Reality App Now Available for Raymarine Dragonfly-PRO Sonar Systems; Nov. 23, 2016; www.raymarine.com/view/blog/news/details/?ID=15032386189 (Year: 2016).*

*Primary Examiner* — Daniel Pihulic
(74) *Attorney, Agent, or Firm* — Haynes and Boone, LLP

(57) ABSTRACT

Techniques are disclosed for systems and methods to provide augmented reality sonar imagery for mobile structures. An augmented reality sonar imagery system includes a portable imaging device, a sonar transducer assembly, and a logic device in communication with the sonar transducer assembly and the portable imaging device. The sonar transducer assembly is adapted to be mounted to a mobile structure and placed in a body of water, and the portable imaging device includes a display and an imager position and/or orientation sensor. The logic device is configured to determine a waterline of the body of water relative to a field of view of the display and render sonar data in a portion of the field of view that extends below the waterline. Subsequent user input and/or the sonar data may be used to adjust a steering actuator, a propulsion system thrust, and/or other operational systems.

20 Claims, 6 Drawing Sheets

Related U.S. Application Data

(60) Provisional application No. 62/044,906, filed on Sep. 2, 2014.

(51) Int. Cl.
*G01S 15/96* (2006.01)
*G01S 7/62* (2006.01)

(56) References Cited

U.S. PATENT DOCUMENTS

| | | | |
|---|---|---|---|
| 2004/0032493 A1 | 2/2004 | Franke et al. | |
| 2010/0238161 A1* | 9/2010 | Varga | G06T 17/05 345/419 |
| 2010/0245387 A1* | 9/2010 | Bachelder | G06T 19/006 345/633 |
| 2011/0141242 A1 | 6/2011 | Fernandez Alvarez et al. | |
| 2013/0192451 A1 | 8/2013 | Scott et al. | |
| 2014/0057677 A1* | 2/2014 | Liubinas | G01S 15/96 455/556.1 |
| 2014/0064024 A1* | 3/2014 | Maguire | G01S 15/89 367/7 |
| 2015/0078123 A1* | 3/2015 | Batcheller | G01S 17/89 367/7 |
| 2016/0027209 A1* | 1/2016 | Demirli | G06F 3/015 345/419 |
| 2016/0063768 A1* | 3/2016 | Parente Da Silva | G06T 19/006 345/633 |
| 2016/0214534 A1* | 7/2016 | Richards | H04N 5/332 |
| 2016/0259520 A1* | 9/2016 | Gatland | G01S 15/025 |
| 2017/0160393 A1* | 6/2017 | Gatland | G01S 15/025 |
| 2017/0168159 A1* | 6/2017 | Gatland | G01S 15/96 |
| 2017/0176586 A1* | 6/2017 | Johnson | G01C 17/38 |
| 2017/0227639 A1* | 8/2017 | Stokes | G01S 15/89 |
| 2017/0312031 A1* | 11/2017 | Amanatullah | G09B 23/28 |
| 2017/0312032 A1* | 11/2017 | Amanatullah | A61B 34/10 |
| 2017/0323487 A1* | 11/2017 | Parente Da Silva | G06T 19/006 |
| 2018/0095170 A1* | 4/2018 | Gatland | G01S 15/025 |
| 2018/0105039 A1* | 4/2018 | Yeomans | B60K 28/04 |
| 2018/0106619 A1* | 4/2018 | Johnson | G01C 21/18 |
| 2018/0143314 A1* | 5/2018 | Pelletier | G01S 7/295 |
| 2018/0164434 A1* | 6/2018 | Stokes | G01S 7/6218 |
| 2018/0165870 A1* | 6/2018 | Stokes | G06T 11/20 |
| 2018/0217256 A1* | 8/2018 | Stokes | G01S 15/025 |
| 2018/0217257 A1* | 8/2018 | Murphy | A01K 79/00 |
| 2018/0259338 A1* | 9/2018 | Stokes | G01C 21/005 |
| 2018/0259339 A1* | 9/2018 | Johnson | G01C 21/005 |

FOREIGN PATENT DOCUMENTS

| | | | | |
|---|---|---|---|---|
| WO | WO-2016073060 A2 * | 5/2016 | | G01S 15/96 |
| WO | WO-2016073060 A3 * | 6/2016 | | G01S 15/96 |
| WO | WO-2016073060 A9 * | 9/2016 | | G01S 15/96 |
| WO | WO-2017131838 A2 * | 8/2017 | | G01C 21/005 |
| WO | WO-2017131838 A9 * | 8/2017 | | G01C 21/005 |
| WO | WO-2017131838 A3 * | 10/2017 | | G01C 21/005 |

* cited by examiner

AUGMENTED REALITY SONAR IMAGERY SYSTEMS AND METHODS

CROSS REFERENCE TO RELATED APPLICATIONS

This application is a continuation of International Patent Application No. PCT/US2015/045962 filed Aug. 19, 2015 and entitled "AUGMENTED REALITY SONAR IMAGERY SYSTEMS AND METHODS", which is incorporated herein by reference in its entirety.

International Patent Application No. PCT/US2015/045962 filed Aug. 19, 2015 claims priority to and the benefit of U.S. Provisional Patent Application No. 62/044,906 filed Sep. 2, 2014 and entitled "AUGMENTED REALITY SONAR IMAGERY SYSTEMS AND METHODS", which is hereby incorporated by reference in its entirety.

TECHNICAL FIELD

One or more embodiments of the invention relate generally to sonar systems and more particularly, for example, to systems and methods for providing augmented reality sonar imagery.

BACKGROUND

Sonar may be used to perform bathymetry, detect underwater hazards, find fish, and/or otherwise assist in navigation by producing data and/or imagery of a water column and/or a floor of a body of water beneath a watercraft. Conventional sonar systems often include a display configured to provide traditionally recognizable sonar imagery based on the sonar data to a user.

Sonar imagery is typically provided without reference to any visible feature or features disposed above a waterline of the body of water, and so a user can easily misinterpret relative depths, sizes, and other critical distances reflected in the sonar imagery. At the same time, consumer market pressures and convenience dictate easier to use systems that include a variety of user-defined features and that produce high quality resulting imagery. Thus, there is a need for an improved methodology to provide feature-rich sonar systems, particularly in the context of providing easily intuited sonar data and/or imagery important to general operation of a watercraft.

SUMMARY

Techniques are disclosed for systems and methods to provide augmented reality sonar imagery for mobile structures. An augmented reality sonar imagery system may include portable imaging devices, sonar transducer assemblies, and logic devices in communication with the sonar transducer assemblies and portable imaging devices. Each sonar transducer assembly may be adapted to be mounted to a mobile structure and placed in a body of water, and each portable imagery system may include an imager position and/or orientation sensor (IPOS). The logic devices may be configured to determine a waterline of the body of water relative to a field of view (FOV) of a display and render sonar data in a portion of the FOV that extends below the waterline. Subsequent user input and/or the sonar data may be used to adjust a steering actuator, a propulsion system thrust, and/or other operational systems of the mobile structure.

In various embodiments, an augmented reality sonar imagery system may include one or more orientation sensors, position sensors, gyroscopes, accelerometers, and/or additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a portable imaging device comprising a display and an imager position and/or orientation sensor (IPOS), a sonar transducer assembly adapted to be mounted to a mobile structure and placed in a body of water, and a logic device in communication with the sonar transducer assembly and the portable imaging device. The logic device may be configured to determine a waterline of the body of water relative to an FOV of the display and render sonar data in a portion of the FOV that extends below the waterline.

In another embodiment, a method may include determining a waterline of a body of water relative to an FOV of a display of a portable imaging device, wherein the portable imaging device comprises an IPOS, receiving sonar data from a sonar transducer assembly adapted to be mounted to a mobile structure and placed in the body of water, and rendering the sonar data in a portion of the FOV that extends below the waterline.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, augmented reality sonar imagery may be provided by a portable imaging device and a sonar system including one or more sonar transducer assemblies, orientation sensors, gyroscopes, accelerometers, position sensors, and/or speed sensors providing measurements of an orientation, a position, an acceleration, and/or a speed of the portable imaging device, the sonar transducer assemblies, and/or a coupled mobile structure. For example, the sensors may be mounted to or within the mobile structure (e.g., a watercraft, aircraft, motor vehicle, and/or other mobile structure), or may be integrated with the portable imaging device and/or the sonar transducer assemblies. Embodiments of the present disclosure produce augmented reality sonar imagery that can be referenced to visible objects in the same field of view (FOV), thereby providing sonar imagery that is more intuitive and easier to interpret than sonar data provided by conventional systems and/or methods.

Figure 1A:
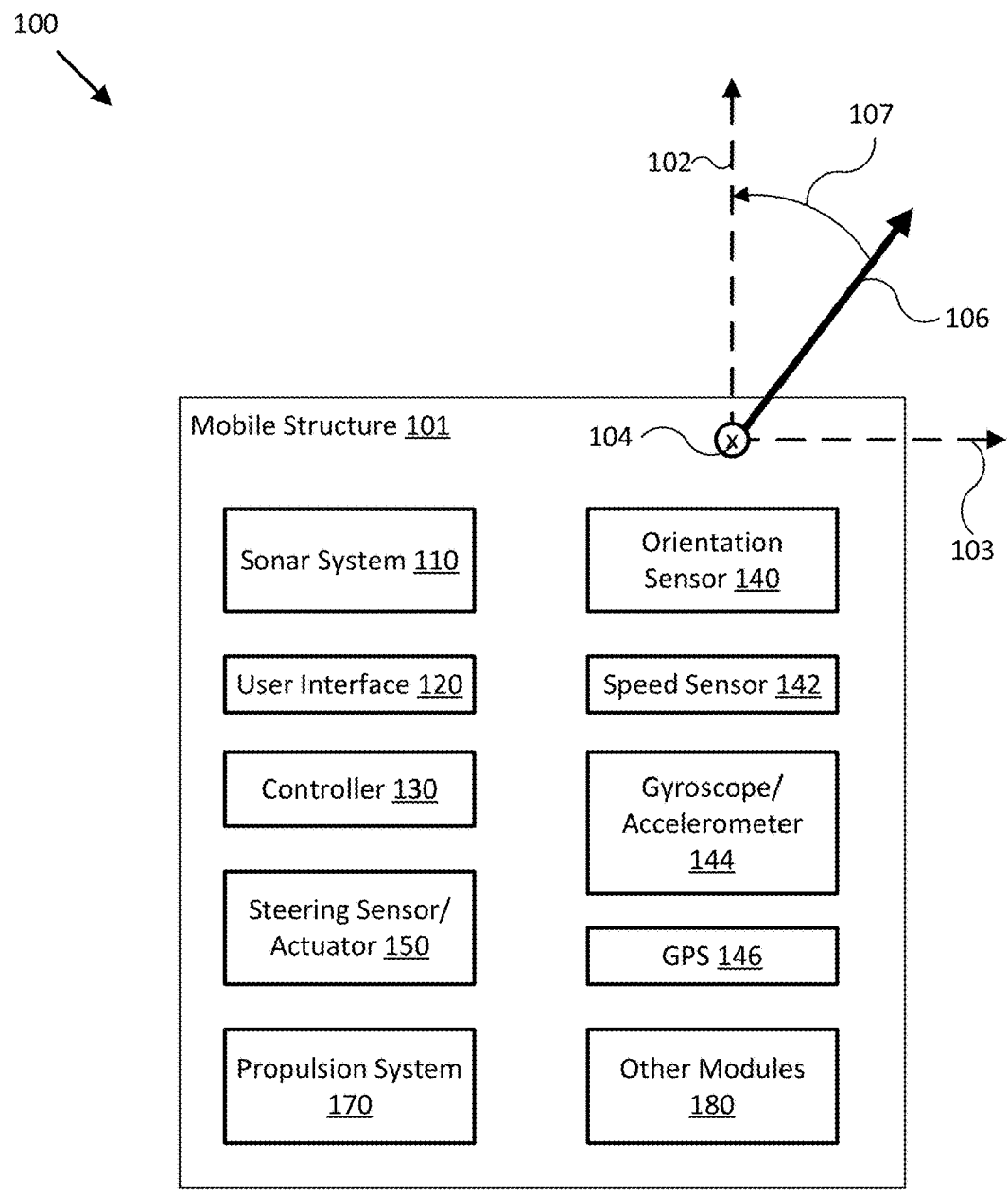
FIG. 1A illustrates a block diagram of an augmented reality sonar imagery system in accordance with an embodiment of the disclosure.

FIG. 1A illustrates a block diagram of system 100 in accordance with an embodiment of the disclosure. In various embodiments, system 100 may be adapted to measure an orientation, a position, an acceleration, and/or a speed of mobile structure 101, sonar system 110, and/or user interface 120. System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 (e.g., or an element of mobile structure 101, such as sonar system 110 and/or user interface 120) based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
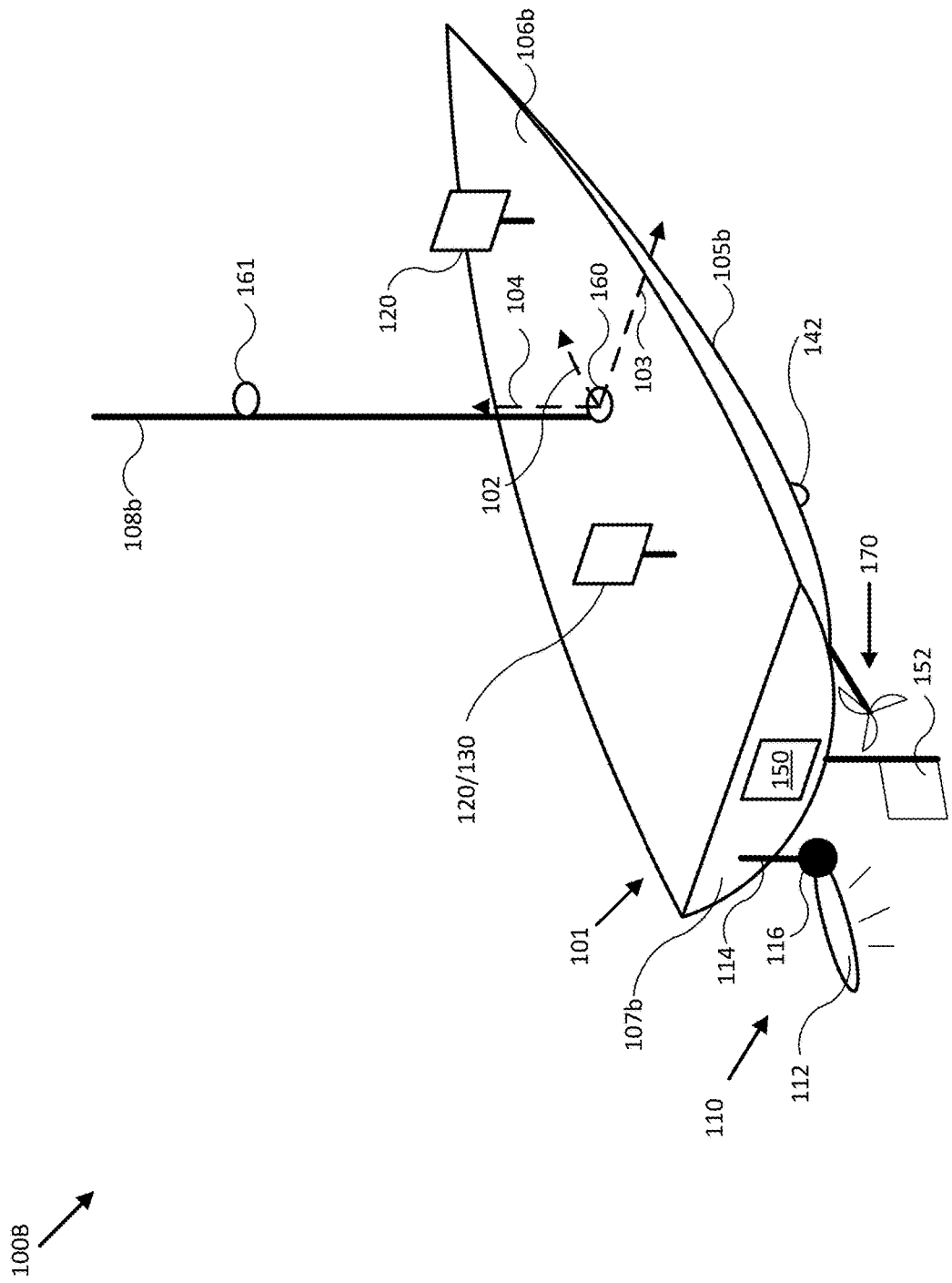
FIG. 1B illustrates a diagram of an augmented reality sonar imagery system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GPS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
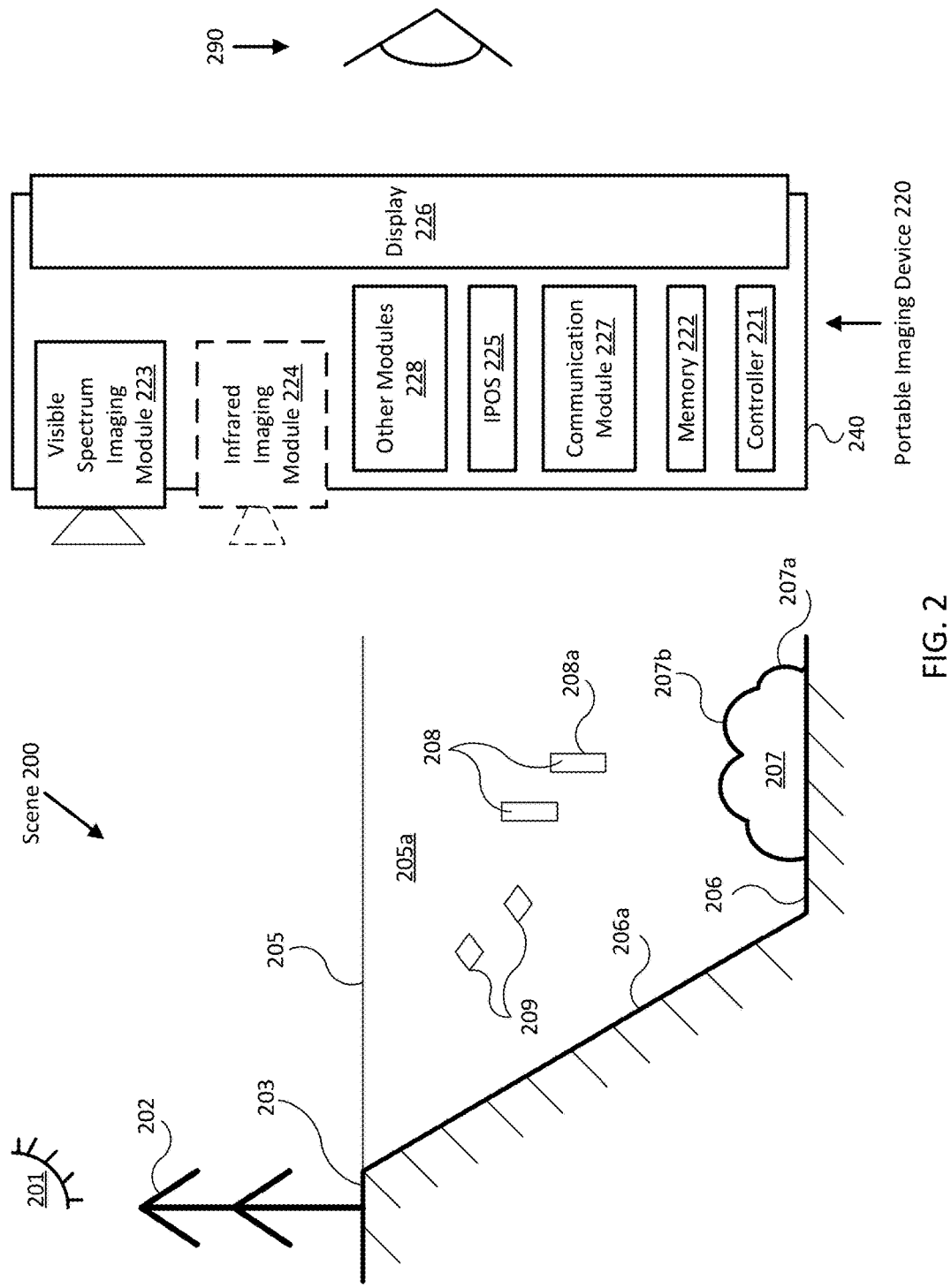
FIG. 2 illustrates a diagram of an augmented reality sonar imagery system in accordance with an embodiment of the disclosure.

FIG. 2 illustrates a diagram of an augmented reality sonar imagery system including a portable imaging device 220 in accordance with an embodiment of the disclosure. In various embodiments, portable imaging device 220 may be implemented with similar functionality as that described with reference to user interface 120 and/or controller 130 in FIGS. 1A and 1B. In the embodiment shown in FIG. 2, portable imaging device 220 may be configured to provide visible spectrum imagery (e.g., using a visible spectrum imaging module 223), infrared spectrum imagery (using optional infrared imaging module 224), and/or sonar imagery (using sonar system 110 of FIGS. 1A and 1B) of scene 200 to a user 290 using a display 226. For example, portable imaging device 220 may be configured to display rendered image data (e.g., provided by imaging modules 223 and/or 224) in a portion of a field of view (FOV) of display 226 that is above waterline 205 and to display rendered sonar data in a portion of the FOV that is below waterline 205.

Image data provided by imaging modules 223 and/or 224 may include an image of a surface of a body of water 205a and various objects or structures above waterline 205, such as the sun 201, a tree 202, and/or a beach 203. Such image data may be processed using feature/pattern recognition techniques to determine a location of waterline 205 within the image data (e.g., if imaging modules 223 and/or 224 are oriented to capture a portion of scene 200 including waterline 205). Sonar data, which may be provided by bathymetric charts and/or past or current use of sonar system 110 of FIGS. 1A and 1B, may include data representative of waterline 205, a floor 206 of body of water 205a, a bank 206a of floor 206, a bottom feature 207 (e.g., a rock or sunken ship), fish 208, other submerged objects 209 (e.g., trash, seaweed), and/or other underwater features within or surrounding body of water 205a. Such underwater features may be indicated and/or differentiated through use of any combination of contour lines, color and/or greyscale mapping and/or shading, three dimensional rendering, and/or other volumetric rendering techniques. In some embodiments, surface orientations of various underwater features (e.g., of side 207a or top 207b of bottom feature 207, or of side 208a of fish 208) may be detected and/or differentiated using similar sonar data and/or image processing techniques. The portions of either or both the image data and the sonar data that are rendered and displayed by display 226, and the techniques used to render the imagery, may be selected based on the location of waterline 205 relative to an FOV of display 226 to provide augmented reality sonar imagery, as described herein.

As shown, portable imaging device 220 may include one or more controllers 221 (e.g., including memory 222), imaging modules (e.g., visible spectrum imaging module 223 and/or infrared imaging module 224), other sensors (e.g., imager position and/or orientation sensor 225), display 226, communication module 227, and/or other modules 228 facilitating operation of portable imaging device 220, which may or may not all be disposed within a common housing 240. In other embodiments, one or more of the modules shown in FIG. 2 may be integrated with a stationary user interface and/or mount (e.g., coupled to deck 106b or mast/sensor mount 108b of mobile structure 101 in FIG. 1B)

and be configured to communicate with devices within housing 240 through a distributed embodiment of communication module 227.

Visible spectrum imaging module 223 and infrared imaging module 224 may be electronic devices configured to capture imagery/image data of scene 200 according to their respective spectrums and provide images to controller 221. In some embodiments, visible spectrum imaging module 223 and infrared imaging module 224 may be implemented according to any similar devices described in U.S. patent application Ser. No. 14/138,058, filed Dec. 21, 2013, and entitled "COMPACT MULTI-SPECTRUM IMAGING WITH FUSION", which is hereby incorporated by reference in its entirety. Moreover, imagery provided by imaging modules 223 and 224 may be combined (e.g., blended, overlaid, fused, or otherwise combined) to provide combined (e.g., from multiple source spectrums) imagery/image data that may be rendered by portable imaging device 220 and/or displayed using display 226 using any of the methods described in U.S. patent application Ser. No. 14/138,058 (incorporated by reference above) and/or as further described herein.

More generally, portable imaging device 220 may include a variety of imaging modules adapted to capture imagery (e.g., image and/or video data) according to visible spectrum, infrared, and other spectrums, for example, and provide corresponding image data to controller 221 or other controllers or devices for rendering and/or display. In some embodiments, imaging modules 223 and/or 224 may be mounted to a mobile structure separate from portable imaging device 220 (e.g., to deck 106b or mast/sensor mount 108b of mobile structure 101 in FIG. 1B, using a fixed or actuated mounts such as imager cluster 161) and be configured to provide imagery to controller 221 using wired and/or wireless communications through communication module 227. In such embodiments, multiple portable imaging devices may be configured to share image data provided by imaging modules mounted to the mobile structure.

Controller 221 and/or memory 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile structure 101, for example, similar to controller 130. In some embodiments, controller 221 may be in communication with various modules of portable imaging device 220 and be configured to receive imagery/image data of scene 200 from imaging modules 223 and/or 224, determine waterline 205 of a body of water 205a in scene 200 (e.g., from image data, position data, and/or orientation data provided by the portable imaging device), render or display image data in any portion of an FOV of display 226 that extends above waterline 205, and/or render and/or display sonar data in any portion of the FOV of display 226 that extends below waterline 205.

In some embodiments, controller 221 may be configured to receive the sonar data and/or imagery from controller 130 and/or sonar system 110 of FIG. 1A or 1B, for example, based on a measured position and/or orientation of portable imaging device 220, either of imaging modules 223 and 224, and/or display 226, provided by imager position and/or orientation sensor (IPOS) 225. Such sonar data and/or imagery may include data from charts, prior ensonifications, and/or current sonar data or imagery provided by, for example, sonar system 110. In further embodiments, controller 221 may be tasked with generating sonar imagery from sonar data, correlating sensor data with sonar data/imagery, communicating operational parameters and/or sensor information with other devices, and/or other operations of systems 100 and/or 100B of FIGS. 1A and 1B. In various embodiments, controller 221 and memory 222 may be integrated together, for example, or may be implemented in a distributed manner across a number of individual controllers and/or memories.

In the embodiment shown in FIG. 2, portable imaging device 220 includes IPOS 225. IPOS 225 may be implemented as one or more orientation sensors, GPS sensors, differential GPS sensors, orientation/position reference transducers and/or optical sensors (e.g., for actuators), visible spectrum and/or infrared imaging modules, and/or other sensors configured to measure a relative and/or absolute orientation and/or position of portable imaging device 220 and/or each of imaging modules 223 and 224 and display 226 and provide such measurements to controller 221. For example, in one embodiment, IPOS 225 may include one or more remote infrared imaging modules (e.g., implemented similar to infrared imaging module 224) fixed to a mobile structure and a number of infrared registration marks disposed on housing 240, and controller 221 may be configured to determine a relative position and/or orientation of portable imaging device 220 from the size and/or position of the infrared registration marks and/or other related characteristics of portable imaging device 220 in image data captured by the one or more remote infrared imaging modules. Such relative position and/or orientation may be relative to a position and/or orientation of the remote infrared imaging modules and/or the mobile structure.

In some embodiments, IPOS 225 may be distributed amongst the various modules of portable imaging device 220 and include one or more individual module IPOSs configured to measure positions and/or orientations of image modules 223 and/or 224 and a separate display IPOS configured to measure a position and/or orientation of display 226. In various embodiments, controller 221 may be configured to combine image data and sonar data according to IPOS measurements and/or measurements of an orientation and/or position of a coupled sonar system (e.g., from a corresponding SPOS) and/or mobile structure to produce combined imagery, such as visible spectrum images of scene 200 above waterline 205 and/or three dimensional sonar images of scene 200 below waterline 205. In other embodiments, controller 221 may be configured to use orientation and/or position measurements of portable imaging device 220, imaging modules 223 and 224, display 226, and/or a mobile structure to control one or more actuators to adjust a position and/or orientation of imaging modules 223 and 224 and/or portions of an associated sonar system (e.g., transducer assembly 112) to image or ensonify a particular position and/or orientation of scene 200 relative to an FOV of display 226.

Display 226 may be implemented as one or more LCDs, OLEDs, touch screen displays, projection devices, and/or other digital displays that may be configured to display image data from imaging modules 223 and 224 and/or sonar data (e.g., from sonar system 110 of FIGS. 1A and 1B) rendered by controller 221 to user 290. In various embodiments, display 226 may be characterized by an FOV that is a function of the available pixel dimensions of display 226, the position and/or orientation of display 226, the FOVs of imaging modules 223 and/or 224, and an effective optical zoom level applied to the image data provided by imaging modules 223 and/or 224. For example, where imaging modules 223 and 224 are within the same housing 240 as display 226, the position and orientation of display 226 may be substantially the same as that of imaging modules 223 and/or 224, and the FOV of display 226 may be the same as that for imaging modules 223 and/or 224 as modified by the effective zoom level and the pixel dimensions of display 226. In other embodiments, where imaging modules 223 and/or 224 are mounted outside of housing 240, the FOV of display 226 may be dependent on the absolute or relative position and/or orientation of display 226 as compared to that of imaging modules 223 and/or 224.

In some embodiments, the effective optical zoom level may be adjusted to produce an FOV for display 226 that substantially reproduces a direct view of scene 200 as experienced by user 290, for example, so that objects within scene 200 are approximately the same size when viewed by user 290 with or without use of portable imaging device 220. In such embodiments, the effective optical zoom level may be adjusted by sensing a distance between user 290 and display 226 and then selecting the effective optical zoom level based on that distance to reproduce the direct view of scene 200. In other embodiments, the effective optical zoom level may be adjusted by user input to reproduce the direct view and/or to select a higher or lower effective optical zoom level to increase or decrease the FOV of and/or the image detail produced by display 226. The effective optical zoom level may be adjusted using digital image processing techniques, manual and/or actuated adjustment of optical components within imaging modules 223 and/or 224, or any combination of image processing or optical adjustments.

Communication module 227 may be implemented as any wired and/or wireless interface configured to communication sensor data, configuration data, parameters, and/or other data and/or signals between portable imaging device 220 and other elements of mobile structure 101 (e.g., as shown in FIGS. 1A and 1B) and/or amongst modules of portable imaging device 220. As described herein, in some embodiments, communication module 227 may be implemented in a distributed manner such that portions of communication module 227 are implemented within one or more modules of portable imaging device 220 that may or may not be disposed within housing 240.

Other modules 228 may include other and/or additional sensors, sensor arrays, actuators, logic devices, communications modules/nodes, power and/or power distribution components, and/or user interface devices used to provide additional environmental information and/or configuration parameters, for example, and/or to adjust a position and/or orientation of portable imaging device 220. In some embodiments, other modules 228 may include various environmental sensors providing measurements and/or other sensor signals that can be displayed to a user and/or used by other devices of portable imaging device 220 (e.g., controller 221) to facilitate operation of portable imaging device 220. In some embodiments, other modules 228 may include one or more buttons and/or other user input devices configured to accept manual user input. In other embodiments, other modules may include one or more distance detectors configured to detect user 290 and/or measure or estimate a distance between display 226 and user 290.

In various embodiments, portable imaging device 220 may be implemented in a single housing 240 with a single display (e.g., display 225) adapted to be held by user 290 while user 290 views the display. In other embodiments, housing 240 may be mounted to a mobile structure using a fixed or actuated mount to provide a fixed or actuated view relative to an orientation of the mobile structure. In some embodiments, portable imaging device 220 may be implemented as a wearable device, such as a pair of glasses including a plurality of displays configured to provide the same image to each eye of user 290 individually or to provide stereoscopic imagery to both eyes of user 290. Such stereoscopic imagery may be generated using multiple instances of imaging modules 223 and/or 224, for example, or by applying various image processing techniques to image and/or sonar data to provide a simulation of depth.

Figure 3:
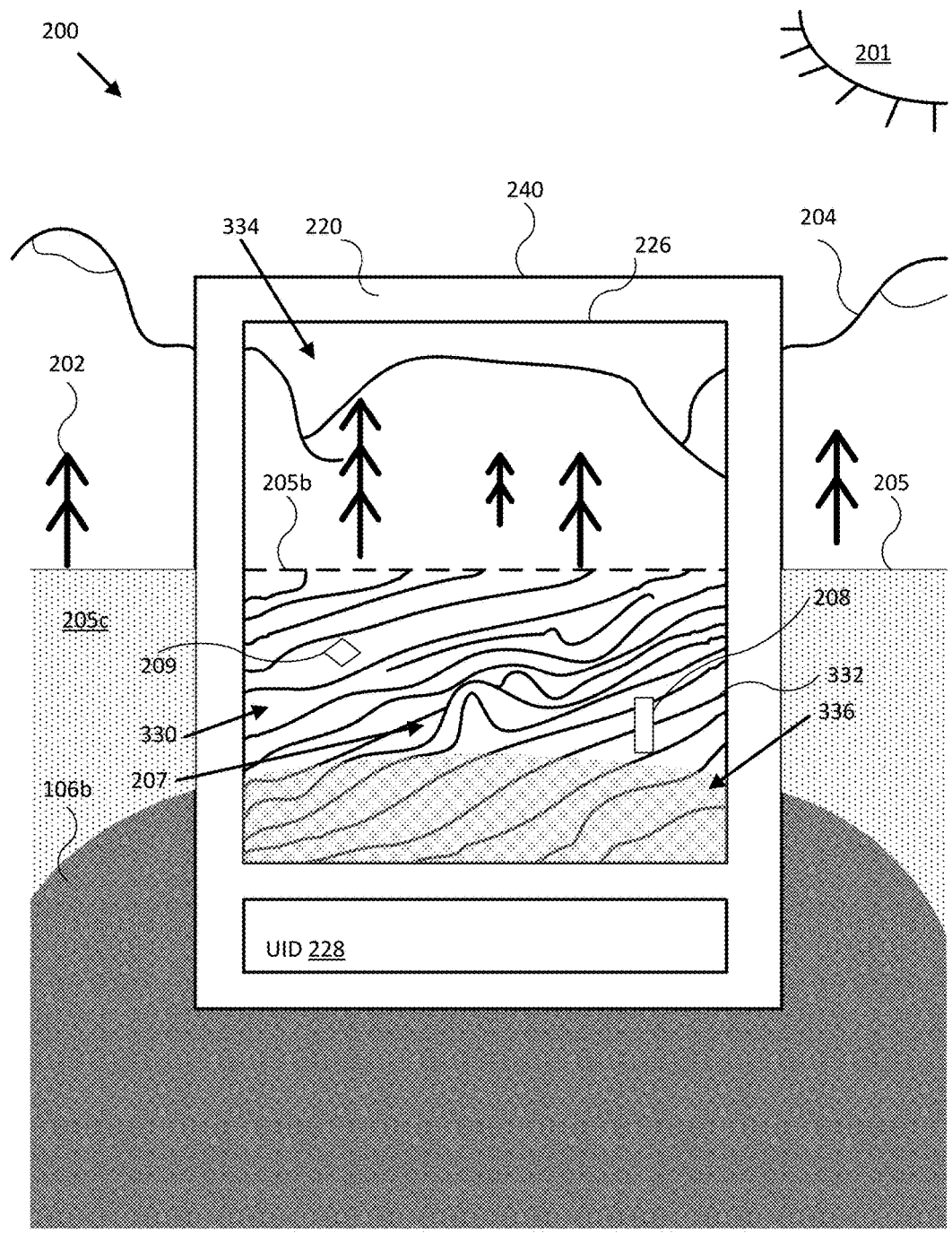
FIG. 3 illustrates a diagram of an augmented reality sonar imagery system in accordance with an embodiment of the disclosure.

FIG. 3 illustrates a diagram of an augmented reality sonar imagery system including an embodiment of portable imaging device 220 of FIG. 2, in accordance with an embodiment of the disclosure. In the embodiment shown in FIG. 3, portable imaging device 220 is oriented to illustrate imagery displayed by display 226 as viewed by user 290 of FIG. 2, where the effective optical zoom level is adjusted to reproduce a direct view of scene 200 (except for a relatively small portion of the direct view obscured by housing 240 and/or user input device 228.

Scene 200 includes features above waterline 205 illustrated in FIG. 2 and additionally includes mountains/land features 204, surface 205c of body of water 205a, and deck 106b (e.g., of mobile structure/boat 101 in FIG. 1B). Also shown in FIG. 3, and in particular in the FOV of display 226, are detected waterline 205b, portion 330 of the FOV that extends below waterline 205b, and portion 334 of the FOV that extends above waterline 205b. Portable imaging device 220 may in some embodiments be configured to render detected waterline 205b in display 226 to illustrate a detected location of waterline 205 relative to the FOV of display 226. Portion 330 may include imagery representing bottom feature 207, fish 208, and submerged object 209, similar to objects illustrated in FIG. 2. For example, as shown in FIG. 3, portion 330 may include a number of contour lines 332 rendered by a controller (e.g., controller 221 of FIG. 2) to distinguish depths, relative distances, various characteristics of bathymetric data, and/or other characteristics of underwater features. Alternatively, or in addition, portion 330 may include icons and/or other types of graphical indicators configured to illustrate a position and/or distance to fish 208 or submerged object 209, and/or to distinguish between the two (e.g., based on fish detection processing performed on acoustic returns from fish 208 and/or submerged object 209). Although the FOV of display 226 in FIG. 3 is shown to include both portions 330 and 334, a different position and/or orientation of display 226 and/or portable imaging device 220 could result in portion 330 or 334 encompassing the entire FOV of display 226.

In some embodiments, age or source of sonar data may be differentiated by rendering substantially real time sonar data differently from prior-acquired and/or survey map sonar data (e.g., a $3^{rd}$ party provided chart or collection of bathymetric data for a particular body of water stored in memory, such as memory 222 of FIG. 2). For example, substantially real time sonar data may be rendered in color and prior-acquired and/or survey map sonar data may be rendered in greyscale. In some embodiments, a relative age of once real time sonar data may be indicated by reducing a chrominance level of the sonar data as the sonar data ages. In additional embodiments, portable imaging device 220 (e.g., controller 221 of FIG. 2) may be configured to detect or determine various surfaces of underwater features based on acoustic returns from the surfaces and/or one or more volumetric renderings of corresponding sonar data, and the relative or absolute orientations of the various surfaces may be determined from the volumetric renderings. In such embodiments, portable imaging device 220 may be configured to indicate the relative or absolute surface orientations in portion 330 by mapping the surface orientations to a color and/or intensity map and rendering the sonar data corresponding to the determined surfaces in a corresponding color.

Also shown in portion 330 of the FOV of display 226 is overlapping portion 336, which indicates where deck 106b would otherwise obscure direct view of surface 205c. In some embodiments, portable imaging device 220 may be configured to determine whether portion 330 overlaps with a view of a mobile structure disposed on surface 205c (e.g., mobile structure 101 of FIG. 1A or 1B), thereby forming overlapping portion 336. If overlapping portion 336 exists, portable imaging device 220 may be configured to blend image data of the mobile structure (e.g., captured by imaging modules 223 and/or 224) with sonar data in overlapping portion 336 and rendering the blended data in the overlapping portion 336. In embodiments where portable imaging device 220 is worn by a user and generally occludes direct view of the user's surroundings, the blended imagery can provide a user with a view of sonar data beneath the mobile structure but protect the user from stumbling into objects on the mobile structure and/or walking off deck 106b.

Figure 4:
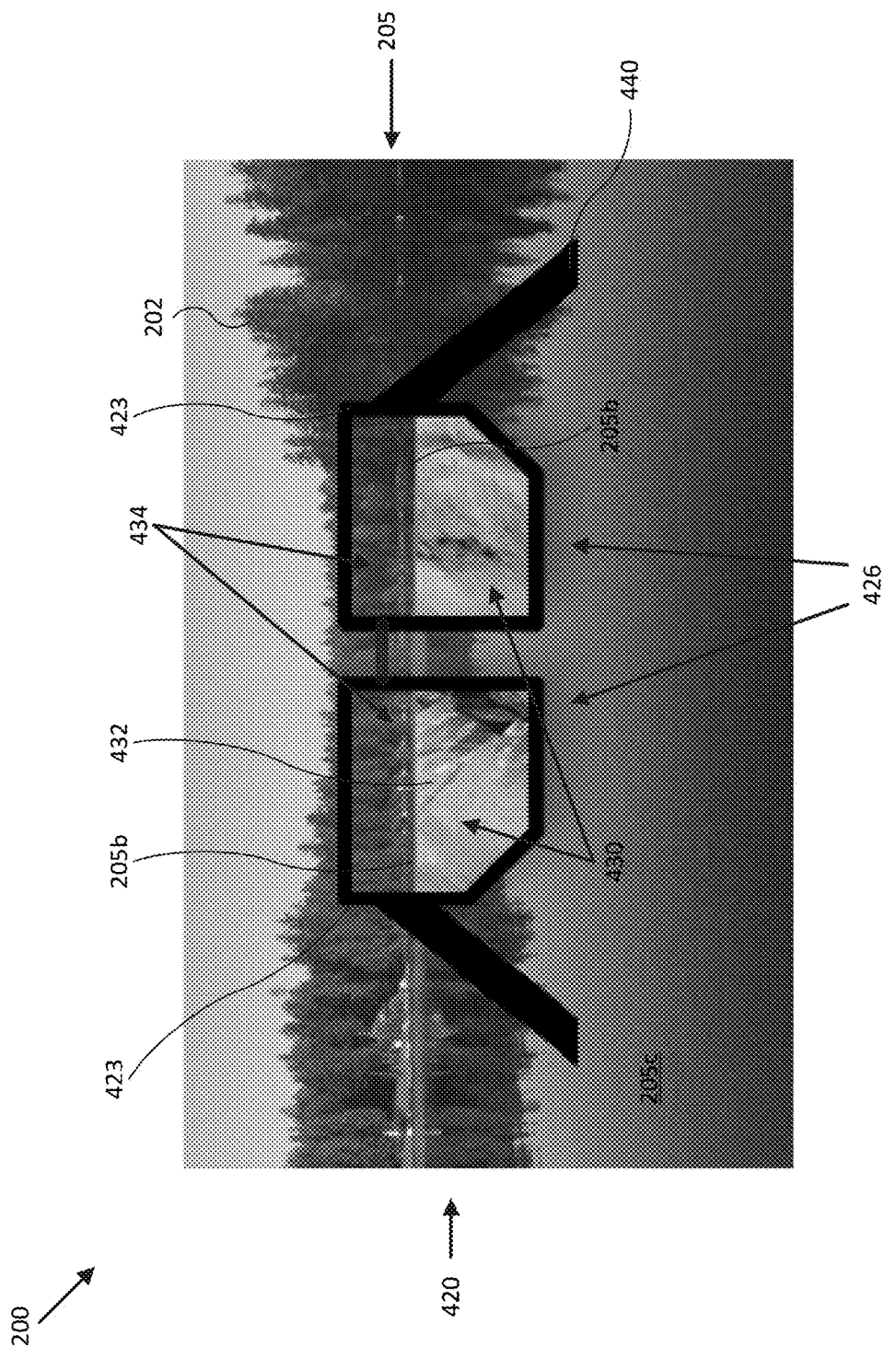
FIG. 4 illustrates a diagram of an augmented reality sonar imagery system in accordance with an embodiment of the disclosure.

FIG. 4 illustrates a diagram of an augmented reality sonar imagery system including wearable portable imaging device 420 in accordance with an embodiment of the disclosure. In various embodiments, portable imaging device 420 may be implemented with similar functionality as that described with reference to portable imaging device 220 in FIGS. 2 and 3. In the embodiment shown in FIG. 4, wearable portable imaging device 420 is oriented to illustrate imagery displayed by displays 426 (e.g., one per user eye) as viewed by a user wearing portable imaging device 420, where the effective optical zoom level is adjusted to reproduce a direct view of scene 200 (except for a relatively small portion of the direct view obscured by imaging modules 423 and/or frame 440).

FIG. 4 includes some of the features above waterline 205 illustrated in scene 200 of FIGS. 2 and 3, and, in particular in the FOV of displays 426, includes detected waterlines 205b, portions 430 of the FOV that extend below respective waterlines 205b, and portions 434 of the FOV that extend above respective waterlines 205b. Portions 430 may include color and/or intensity shading 432 rendered by a controller (e.g., controller 221 of FIG. 2) to distinguish depths, relative distances, various characteristics of bathymetric data, and/or other characteristics of various underwater features.

As illustrated in FIG. 4, wearable portable imaging device 420 may include one or more imaging modules 423, which may be implemented as visible spectrum and/or infrared imaging modules configured to provide monocular (e.g., copied to both displays 426) and/or stereoscopic image data depending on the number and arrangement of imaging modules and the type of image processing applied to image data provided by imaging modules 423. In addition, an IPOS (e.g., IPOS 225 of FIG. 2) may be integrated with any of imaging modules 423, displays 426, and/or frame 440 and be configured to provide a position and/or orientation of one or more of the features to facilitate determining FOVs for displays 426. In some embodiments, portable imaging device 420 may be configured to determine portion 430 of the FOV of display 426 and use an SPOS and actuator in an associated transducer assembly (e.g., actuator 116 coupled to transducer assembly 112 of sonar system 110 in FIG. 1B) to ensonify at least a subset of portion 430 substantially in real time as a user adjusts a position or orientation of wearable portable imaging device 420 by, for example, moving the user's head. Sonar data provided by the associated transducer assembly may be rendered using position data and/or orientation data provided by the SPOS to correlate the sonar data with portion 430, for example, and/or to facilitate other rendering processing described herein.

In some embodiments, displays 426 may be implemented with substantially transparent display panels, where the only portions of displays 426 that obscure a direct view of scene 200, as seen by a user wearing portable imaging device 420, are those portions actively displaying rendered image data. In such embodiments, portable imaging device 420 may be configured to render and display portions 430 and/or detected waterlines 205b using displays 426 without also rendering portions 434.

Power for portable imaging device 420 may be embedded within frame 440 and/or electrically coupled to portable imaging device 420 through use of a wire harness and/or an external power source, such as a battery pack or a power source for a mobile structure.

Figure 5:
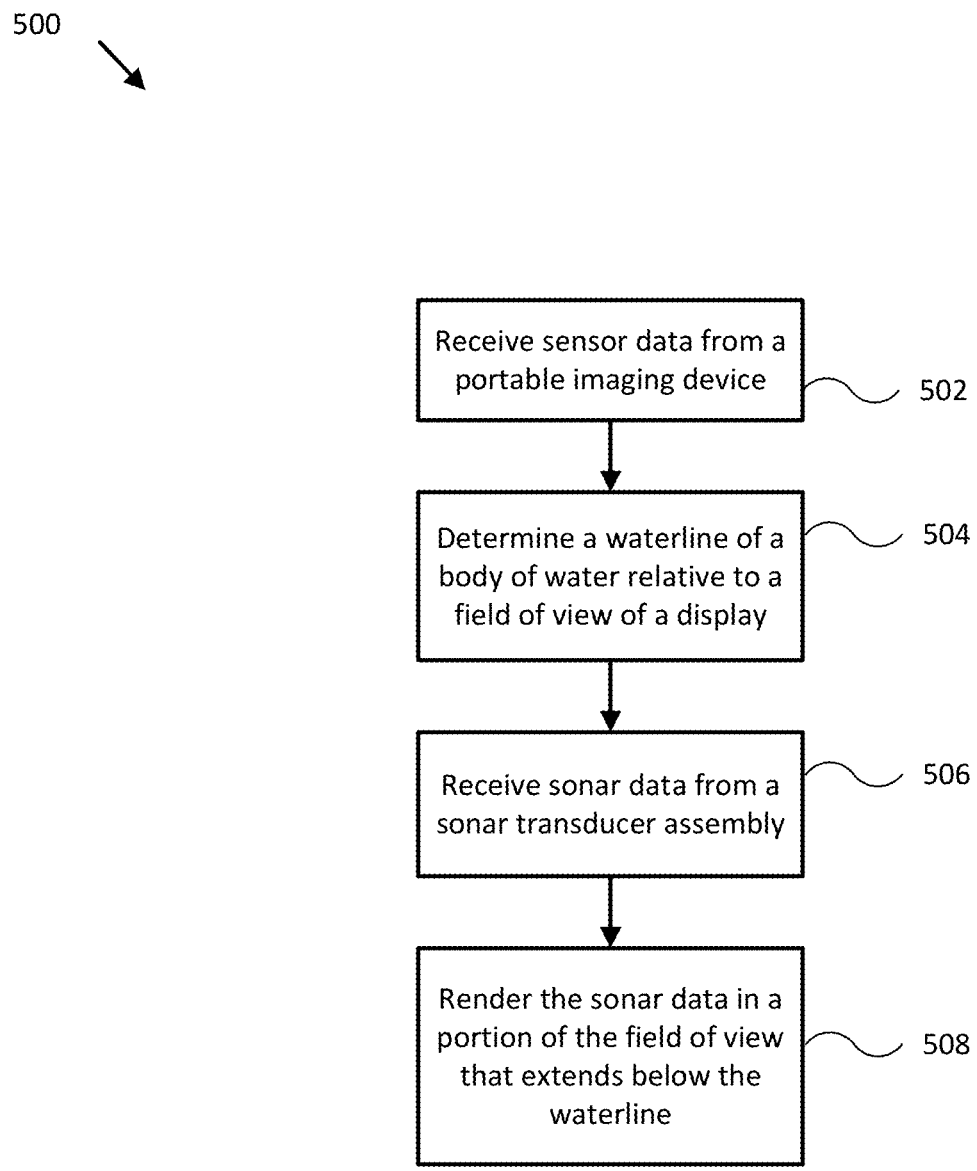
FIG. 5 illustrates a flow diagram of various operations to operate an augmented reality sonar imagery system in accordance with an embodiment of the disclosure.

FIG. 5 illustrates a flow diagram of process 500 to provide augmented reality sonar data and/or imagery for mobile structure 101 in accordance with embodiments of the disclosure. In some embodiments, the operations of FIG. 5 may be implemented as software instructions executed by one or more logic devices associated with corresponding electronic devices, sensors, and/or structures depicted in FIGS. 1A through 4. More generally, the operations of FIG. 5 may be implemented with any combination of software instructions and/or electronic hardware (e.g., inductors, capacitors, amplifiers, actuators, or other analog and/or digital components).

It should be appreciated that any step, sub-step, subprocess, or block of process 500 may be performed in an order or arrangement different from the embodiments illustrated by FIG. 5. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems described in reference to FIGS. 1A-4, process 500 may be performed by other systems different from those systems and including a different selection of electronic devices, sensors, assemblies, mobile structures, and/or mobile structure attributes.

Process 500 represents a method for providing augmented reality sonar data and/or imagery using systems 100, 100B, 220, and/or 420 in accordance with embodiments of the disclosure. At the initiation of process 500, various system parameters may be populated by prior execution of a process similar to process 500, for example, or may be initialized to zero and/or one or more values corresponding to typical, stored, and/or learned values derived from past operation of process 500, as described herein.

In block 502, a logic device receives sensor data from a portable imaging device. For example, controller 130 of systems 100 or 100B and/or controller 221 of portable imaging device 220 may be configured to receive visible spectrum image data and/or infrared image data from corresponding imaging modules 223 and/or 224, and position and/or orientation data corresponding to imaging modules 223 and/or 224 and/or display 226 of portable imaging device 220 from IPOS 225. In some embodiments, the controller may be configured to receive position and/or orientation data corresponding to display 225 and then use the position and/or orientation data to aim imaging modules 223 and/or 224 (e.g. using control signals provided to actuators coupled to imaging modules 223 and/or 224) so that their FOVs substantially overlap with an FOV and/or relative orientation of display 226.

In block 504, a logic device determines a waterline of a body of water relative to a field of view of a display. For example, controller 130 of systems 100 or 100B and/or controller 221 of portable imaging device 220 may be configured to determine a waterline using the image data, position data, and/or orientation data acquired in block 502. In some embodiments, the controller may be configured to use feature and/or pattern recognition processing to detect a location of waterline 205 within image data provided by imaging modules 223 and/or 224. The controller may then use the various position and/or orientation data, the location of waterline 205 within the image data, various characteristics of display 226, and/or an effective optical zoom level to determine waterline 205b of body of water 205a relative to the FOV of display 226, as described herein.

In block 506, a logic device receives sonar data from a sonar transducer assembly. For example, controller 130 of systems 100 or 100B and/or controller 221 of portable imaging device 220 may be configured to receive sonar data from sonar transducer assembly 112 of sonar system 110. In some embodiments the controller may be configured to transmit position and/or orientation data corresponding to portion 330 of the field of view of display 226 that extends below waterline 205b, determined in block 504, to sonar system 110 to aim transducer assembly 112 (e.g., using actuator 116 and/or an associated SPOS) at portion 330 (e.g., or to sweep transducer assembly 112 through portion 330) to acquire substantially real time sonar data corresponding to portion 330. In other embodiments, the controller may be configured to transmit such position and/or orientation data to receive sonar data limited to portion 330, such as from prior-acquired sonar data and/or from a survey map limited by partitioning the sonar data according to corresponding position and/or orientation data, which may be provided by an SPOS when the sonar data was acquired.

In block 508, a logic device renders sonar data in a portion of an FOV that extends below a waterline. For example, controller 130 of systems 100 or 100B and/or controller 221 of portable imaging device 220 may be configured to render sonar data acquired in block 506 in portion 330, as determined in part through operation of blocks 502 and/or 504. In some embodiments, the controller may be configured to render image data provided by imaging modules 223 and/or 224 in portion 334 (e.g., the portion of the FOV of display 226 that extends above waterline 205b). In such embodiments, the controller may be configured to generate combined image data from visible spectrum data and infrared image data and render the combined image data in at least a part of portion 334. In other embodiments, the controller may be configured to determine whether portion 330 overlaps with a view of mobile structure 101 (e.g., whether portion 336 exists) and blend (e.g., fuse, alpha blend, or otherwise combine) image data provided by imaging modules 223 and/or 224 with sonar data in overlapping portion 336 when rendering portion 336.

In various embodiments, the controller may be configured to apply various types of image processing to the sonar data when rendering portions 330 and/or 336, such as processing to visually differentiate real time and prior-acquired sonar data, to visually indicate a relative age of different portions of sonar data, to visually indicate surface orientations of underwater features, and/or to provide additional methods to visually differentiate different underwater features and/or different underwater feature characteristics from one another. Similarly, in some embodiments, the controller may be configured to apply various types of image processing to image data when rendering portion 334, such as processing to differentiate above-water objects from one another in low light or otherwise limited visibility environments.

In further embodiments, image data, position data, orientation data, and/or sonar data acquired and/or processed in blocks 502-508 may be used to control operation of mobile structure 101, such as by controlling steering sensor/actuator 150 and/or propulsion system 170 to steer mobile structure 101 according to an orientation of display 226, for example, and/or according to positions and/or depths of floor 206, bottom feature 207, fish 208, and/or submerged objects 209.

It is contemplated that any one or combination of methods to provide augmented reality sonar imagery may be performed according to one or more operating contexts of a control loop, for example, such as a startup, learning, running, and/or other type operating context. For example, process 500 may proceed back to block 502 and proceed through process 500 again to produce updated augmented reality sonar imagery, as in a control loop.

Embodiments of the present disclosure can thus provide augmented reality sonar imagery. Such embodiments may be used to provide sonar imagery to assist in navigation for a mobile structure, survey of a body of water, and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a portable imaging device comprising a display and an imager position and/or orientation sensor (IPOS);
a sonar transducer assembly adapted to be mounted to a mobile structure and placed in a body of water; and
a logic device in communication with the sonar transducer assembly and the portable imaging device, wherein the logic device is configured to:

determine a waterline of the body of water relative to a field of view (FOV) of the display; and
render sonar data in a portion of the FOV that extends below the waterline.

2. The system of claim 1, wherein the logic device is configured to:
determine the waterline using image data, position data, and/or orientation data provided by the portable imaging device and/or IPOS.

3. The system of claim 1, wherein the logic device is configured to:
render image data provided by the portable imaging device in another portion of the FOV that extends above the waterline.

4. The system of claim 1, wherein:
the sonar transducer assembly comprises a sonar position and/or orientation sensor (SPOS); and
the logic device is configured to render the sonar data in the portion of the FOV that extends below the waterline using position data and/or orientation data provided by the SPOS.

5. The system of claim 1, wherein:
the sonar transducer assembly comprises a sonar position and/or orientation sensor (SPOS) and a sonar actuator configured to adjust a position and/or orientation of the sonar transducer assembly; and
the logic device is configured use the SPOS and the sonar actuator to ensonify at least a subset of the portion of the FOV that extends below the waterline.

6. The system of claim 1, further comprising a second portable imaging device in communication with the logic device, wherein the logic device is configured to:
determine a second waterline relative to a second FOV of a second display of the second portable imaging device; and
render sonar data in a portion of the second FOV that extends below the second waterline.

7. The system of claim 1, wherein:
the mobile structure comprises a watercraft;
the logic device is configured to determine the portion of the FOV that extends below the waterline overlaps with a view of the mobile structure; and
the rendering the sonar data comprises blending image data of the mobile structure with the sonar data in the overlapping portion of the FOV and rendering the blended data in the overlapping portion.

8. The system of claim 1, wherein:
the portable imaging device is adapted to be held or worn by a user of the system while the user views the display.

9. The system of claim 1, wherein:
the portable imaging device comprises one or more image modules adapted to be mounted to the mobile structure above the waterline;
the display is adapted to be held or worn by a user of the system while the user views the display;
the IPOS comprises one or more module IPOSs configured to measure positions and/or orientations of the image modules and a display IPOS configured to measure a position and/or orientation of the display; and
the logic device is configured to:
determine the waterline using image data, position data, and/or orientation data provided by the image modules, module IPOSs, and/or display IPOS; and
render image data provided by the image modules in another portion of the FOV that extends above the waterline.

10. The system of claim 1, wherein:
the portable imaging device comprises a visible spectrum image module and an infrared image module; and
the logic device is configured to:
generate combined image data from visible spectrum image data and infrared image data provided by the portable imaging device; and
render the combined image data in at least another portion of the FOV that extends above the waterline.

11. The system of claim 1, wherein the rendering the sonar data comprises:
rendering substantially real time sonar data in color and prior-acquired sonar data in greyscale;
reducing a chrominance level of the sonar data as the sonar data ages;
determining one or more surfaces from the sonar data and mapping orientations of the surfaces to a color map and/or an intensity map; and/or
rendering a portion of a survey map stored in a memory coupled to the logic device.

12. A method comprising:
determining a waterline of a body of water relative to a field of view (FOV) of a display of a portable imaging device, wherein the portable imaging device comprises an imager position and/or orientation sensor (IPOS);
receiving sonar data from a sonar transducer assembly adapted to be mounted to a mobile structure and placed in the body of water; and
rendering the sonar data in a portion of the FOV that extends below the waterline.

13. The method of claim 12, further comprising:
determining the waterline using image data, position data, and/or orientation data provided by the portable imaging device and/or IPOS; and
rendering image data provided by the portable imaging device in another portion of the FOV that extends above the waterline.

14. The method of claim 12, wherein:
the sonar transducer assembly comprises a sonar position and/or orientation sensor (SPOS); and
the method comprises rendering the sonar data in the portion of the FOV that extends below the waterline using position data and/or orientation data provided by the SPOS.

15. The method of claim 12, wherein:
the sonar transducer assembly comprises a sonar position and/or orientation sensor (SPOS) and a sonar actuator configured to adjust a position and/or orientation of the sonar transducer assembly; and
the method comprises using the SPOS and the sonar actuator to ensonify at least a subset of the portion of the FOV that extends below the waterline.

16. The method of claim 12, further comprising:
determining a second waterline relative to a second FOV of a second display of a second portable imaging device; and
rendering sonar data in a portion of the second FOV that extends below the second waterline.

17. The method of claim 12, wherein:
the method comprises determining the portion of the FOV that extends below the waterline overlaps with a view of the mobile structure; and
the rendering the sonar data comprises blending image data of the mobile structure with the sonar data in the overlapping portion of the FOV and rendering the blended data in the overlapping portion.

18. The method of claim 12, wherein:

the portable imaging device comprises one or more image modules adapted to be mounted to the mobile structure above the waterline;

the display is adapted to be held or worn by a user of the system while the user views the display;

the IPOS comprises one or more module IPOSs configured to measure positions and/or orientations of the image modules and a display IPOS configured to measure a position and/or orientation of the display; and the method comprises:

determining the waterline using image data, position data, and/or orientation data provided by the image modules, module IPOSs, and/or display IPOS; and rendering image data provided by the image modules in another portion of the FOV that extends above the waterline.

19. The method of claim 12, wherein:

the portable imaging device comprises a visible spectrum image module and an infrared image module; and the method comprises:

generating combined image data from visible spectrum image data and infrared image data provided by the portable imaging device; and rendering the combined image data in at least another portion of the FOV that extends above the waterline.

20. The method of claim 12, wherein the rendering the sonar data comprises:

rendering substantially real time sonar data in color and prior-acquired sonar data in greyscale;

reducing a chrominance level of the sonar data as the sonar data ages;

determining one or more surfaces from the sonar data and mapping orientations of the surfaces to a color map and/or an intensity map; and/or rendering a portion of a survey map stored in a memory coupled to the logic device.

* * * * *